COUNTER CIRCUITS

Filed Dec. 30, 1960 5 Sheets-Sheet 1

| | A | B | C | CARRY |
|---|---|---|---|---|
| 1 | 1 | 1 | 0 | 0 |
| 2 | 0 | 0 | 1 | 0 |
| 3 | 1 | 0 | 0 | 0 |
| 4 | 0 | 1 | 0 | 0 |
| 0 | 1 | 0 | 1 | 1 |

WILLIAM R. VINCENT
TSIUN LIUEH LEE
WILLIAM L. STAHL
*INVENTORS*

*BY* Lester H. Clark

ATTORNEY

| | A | B | C | D | E |
|---|---|---|---|---|---|
| 0 | 0 | 1 | 0 | 0 | 0 |
| 1 | 1 | 0 | 1 | 1 | 0 |
| 2 | 1 | 1 | 0 | 0 | 0 |
| 3 | 0 | 0 | 1 | 1 | 0 |
| 4 | 1 | 0 | 0 | 0 | 0 |
| 5 | 0 | 1 | 0 | 1 | 0 |
| 6 | 1 | 0 | 1 | 0 | 0 |
| 7 | 1 | 1 | 0 | 1 | 0 |
| 8 | 0 | 0 | 1 | 0 | 0 |
| 9 | 1 | 0 | 0 | 1 | 1 |

| | A | B | C | D | E |
|---|---|---|---|---|---|
| 0 | 1 | 0 | 0 | 0 | 0 |
| 1 | 1 | 1 | 0 | 1 | 0 |
| 2 | 0 | 1 | 1 | 0 | 0 |
| 3 | 0 | 0 | 1 | 1 | 0 |
| 4 | 0 | 0 | 0 | 0 | 0 |
| 5 | 1 | 0 | 0 | 1 | 0 |
| 6 | 1 | 1 | 0 | 0 | 0 |
| 7 | 0 | 1 | 1 | 1 | 0 |
| 8 | 0 | 0 | 1 | 0 | 0 |
| 9 | 0 | 0 | 0 | 1 | 1 |

|   | A | B | C | D | E |
|---|---|---|---|---|---|
| 0 | 0 | 0 | 0 | 1 | 0 |
| 1 | 1 | 0 | 0 | 0 | 0 |
| 2 | 1 | 1 | 1 | 1 | 0 |
| 3 | 0 | 1 | 1 | 0 | 0 |
| 4 | 0 | 0 | 1 | 1 | 0 |
| 5 | 0 | 0 | 0 | 0 | 0 |
| 6 | 1 | 0 | 0 | 1 | 0 |
| 7 | 1 | 1 | 1 | 0 | 0 |
| 8 | 0 | 1 | 1 | 1 | 0 |
| 9 | 0 | 0 | 1 | 0 | 1 |

| | A | B | C | D | E |
|---|---|---|---|---|---|
| 0 | 1 | 1 | 0 | 1 | 0 |
| 1 | 1 | 1 | 1 | 0 | 0 |
| 2 | 0 | 0 | 1 | 1 | 0 |
| 3 | 0 | 0 | 0 | 0 | 0 |
| 4 | 1 | 0 | 0 | 1 | 0 |
| 5 | 1 | 1 | 0 | 0 | 0 |
| 6 | 1 | 1 | 1 | 1 | 0 |
| 7 | 0 | 0 | 1 | 0 | 0 |
| 8 | 0 | 0 | 0 | 1 | 0 |
| 9 | 1 | 0 | 0 | 0 | 1 |

United States Patent Office 3,105,141

Patented Sept. 24, 1963

3,105,141

COUNTER CIRCUITS

Tsiun Liueh Lee, Poughkeepsie, William L. Stahl, Fishkill, and William R. Vincent, Poughkeepsie, N.Y., assignors to International Business Machines Corporation, New York, N.Y., a corporation of New York Filed Dec. 30, 1960, Ser. No. 79,604
12 Claims. (Cl. 235—92)

This invention relates to counter circuits, and particularly to counter circuits utilizing magnetic cores having substantially rectangular hysteresis loops. The circuits described herein are adapted to count a series of electrical current pulses.

There are disclosed herein one binary counter, one quinary counter and four modifications of decimal counters, each embodying various aspects of the invention.

An object of the invention is to provide simplified counter circuits utilizing magnetic cores.

Another object of the invention is to provide improved and simplified quinary counter circuits.

Another object is to provide improved and simplified decimal counter circuits.

The foregoing and other objects of the invention are attained in the several embodiments disclosed herein. One of the embodiments is a binary counter circuit including a magnetic core having a substantially rectangular hysteresis loop, and provided with a drive winding, an output winding and a transfer winding. The output winding is connected in a series loop with a diode and a capacitor. A discharge circuit for the capacitor is provided through the transfer winding so that it acts as a feedback. A capacitor is provided in series with the drive winding, and a discharge path is provided for the capacitor through the drive winding so that each input pulse of one polarity through the winding charges the capacitor and is followed by a pulse of the opposite polarity when the capacitor discharges. This circuit is effective to count the input pulses, producing one output pulse for each two input pulses.

A quinary counter is illustrated including three counting stages and a carry stage. The first quinary counting stage is similar to the binary counting circuit just described. The quinary counting stages have their transfer windings interconnected with those of the carry stage to produce a single output pulse from the carry stage for each five input pulses.

Four different decimal counters are disclosed. Each includes a binary stage, three quinary stages, and a carry stage. The first one disclosed includes a binary stage similar to the binary counter described above and a quinary counter similar to that described above. The binary and quinary counters are interconnected to produce a single output pulse for each ten input pulses. The interconnections between the various stages of the quinary counter differ somewhat in the various decimal counters disclosed.

Other objects and advantages of the invention will become apparent from a consideration of the following specification and claims, taken together with the accompanying drawings, in which:

FIG. 1

Figures 1, 2, 3:
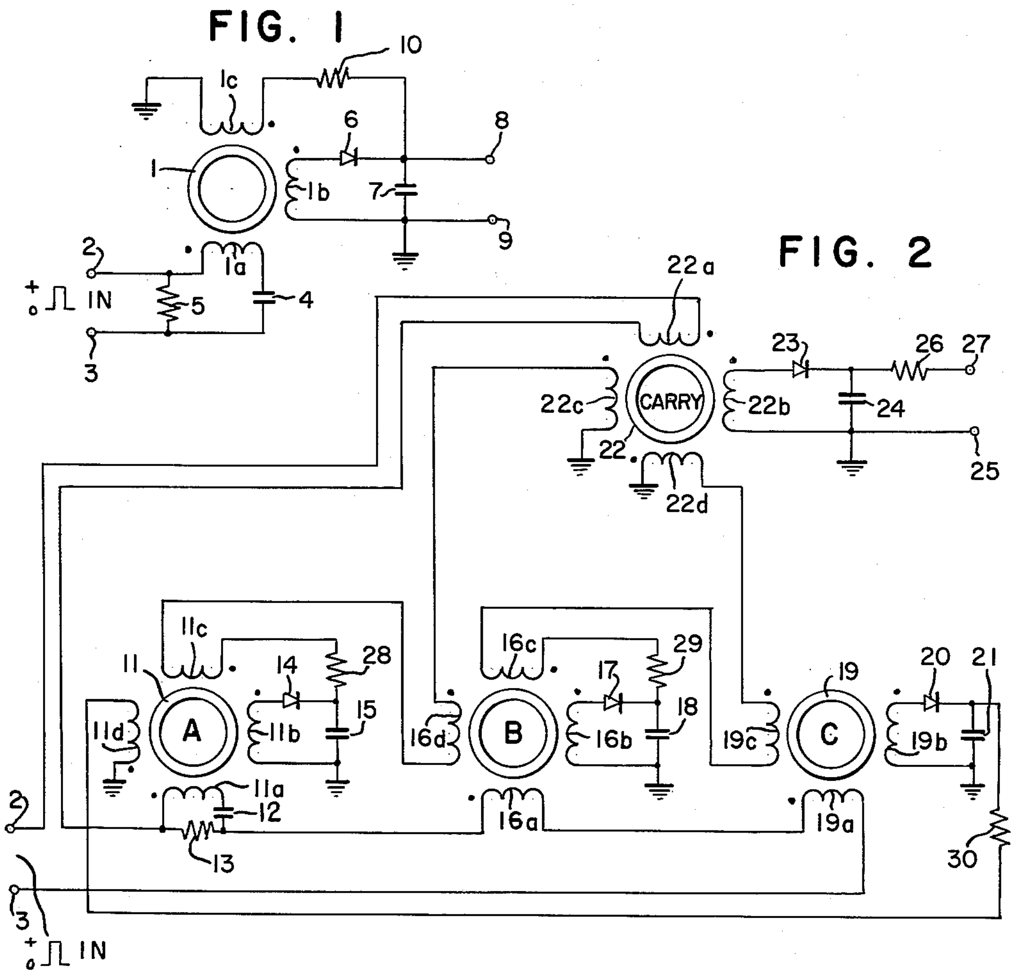
FIG. 1 is a wiring diagram of a binary counter embodying certain features of the invention.
FIG. 2 is a wiring diagram of a quinary counter embodying certain features of the invention.
FIG. 3 is a table indicating the counting steps performed by the respective stages in the counter of FIG. 2.

This figure shows a binary counter including a magnetic core 1 of material having a substantially rectangular hysteresis loop. All the cores described in this specification have such hysteresis loops. Since that factor is common in the art, it will not be further mentioned in this specification. The core 1 is provided with a drive winding 1*a*, an output winding 1*b*, and a transfer winding 1*c*. Square wave input signals are supplied at input terminals 2 and 3. Other wave shapes may be used, as long as the energy supplied is sufficient to switch the cores and to charge a capacitor, where that is required. A capacitor 4 is connected in series with drive winding 1*a*. A resistor 5 is connected across the input terminals 2 and 3. Drive winding 1*a* and resistor 5 form a discharge path for the capacitor 4.

A diode 6 and a capacitor 7 are connected in series with the output winding 1*b* to form a loop. The terminals of the capacitor 7 are connected to output terminals 8 and 9. A feedback loop is connected from terminal 8 through a resistor 10 and winding 1*c* to terminal 9.

*Operation of FIG. 1*

The winding 1*a* drives the magnetization of the core 1 in a particular direction hereinafter termed the "zero" direction. The diode 6 is poled to pass an output pulse only when the magnetization of core 1 changes from the "one" direction to the "zero" direction.

Assume that the core 1 is initially magnetized in the "zero" direction and that a series of positive pulses is applied to the terminals 2 and 3. The first positive pulse does not change the magnetization of the core and hence has no effect on the windings 1*b* and 1*c*, but it does charge the capacitor 4. When the positive pulse terminates, capacitor 4 discharges through winding 1*a*, producing therein a current pulse of negative polarity, driving core 1 in the "one" direction. This negative pulse induces a potential in the winding 1*b*, but current flow through the winding 1*b* is blocked by the diode 6, so that the capacitor 7 is not charged. A similar potential, but of opposite polarity, is induced in winding 1*c*, but no path for current flow from winding 1*c* exists except through the resistor 10. Winding 1*c* has a smaller number of turns than winding 1*b*, and is proportioned with respect to resistor 10 so that it is not effective to charge capacitor 7 appreciably.

On the second positive input pulse at terminals 2 and 3, winding 1*a* is effective to drive the core from magnetization in the "one" sense to magnetization in the "zero" sense. This change in the magnetization of core 1 induces in winding 1*b* a potential effective to send a current pulse through diode 6 and charge capacitor 7. The impedance of capacitor 7 is relatively low as compared to that of resistor 10 and winding 1*c*, so that those elements are not appreciably energized when capacitor 7 is charging. After the positive input pulse terminates, the capacitor 4 discharges through winding 1*a*, tending to drive the core 1 in the "one" direction. However, at this time, capacitor 7 also discharges through resistor 10 and winding 1*c* with a current which flows in a direction to drive core 1 in the "zero" direction. The current flows in windings 1*a* and 1*c* buck each other magnetically and cancel any effect, so that the core 1 remains magnetized in the "zero" sense.

The conditions in the circuit are now restored to the conditions existing at the start of the operation described above. It may be seen that the cycle described repeats itself, producing one output pulse at terminals 8 and 9 for each two input pulses at the terminals 2 and 3.

FIG. 2

This figure illustrates a quinary counter, i.e., one which produces one output pulse for each five input pulses. The quinary counter includes three counting stages, hereinafter identified as the stages A, B and C, and a carry stage.

Stage A comprises a core 11 having a drive winding 11*a*, an output winding 11*b*, and two transfer windings 11*c* and 11*d*. Winding 11*a* is connected in a series loop with a capacitor 12 and a resistor 13. Winding 11*b* is connected in a series loop with a diode 14 and a capacitor 15.

Counter stage B includes a core 16 having a drive winding 16*a*, an output winding 16*b*, and transfer windings 16*c* and 16*d*. Output winding 16*b* is connected in a series loop with a diode 17 and a capacitor 18.

Stage C includes a core 19 having a drive winding 19*a*, an output winding 19*b* and a transfer winding 19*c*. Output winding 19*b* is connected in a series loop with a diode 20 and a capacitor 21.

The carry stage includes a core 22 having a drive winding 22*a*, an output winding 22*b*, and transfer windings 22*c* and 22*d*. Output winding 22*b* is connected in a series loop with a diode 23 and a capacitor 24. One terminal of capacitor 24 is connected to grounded output terminal 25. The other terminal of capacitor 24 is connected through a resistor 26 to another output terminal 27.

Resistor 13 and drive windings 16*a*, 19*a* and 22*a* are connected in series between the input terminals 2 and 3 which correspond to the input terminals 2 and 3 of FIG. 1. Winding 11*a* and capacitor 12 are connected across resistor 13. As an alternative to the series drive for the carry input winding 22*a*, as shown, an independent synchronized drive may be preferred in many cases.

A discharge circuit for capacitor 15 of stage A may be traced through a resistor 28, transfer winding 11*c* of stage A, transfer winding 16*d* of stage B and transfer winding 22*c* of the carry stage.

A discharge circuit for capacitor 18 may be traced through a resistor 29, transfer winding 16*c* of stage B, transfer winding 19*c* of stage C and transfer winding 22*d* of the carry stage.

A discharge circuit for capacitor 21 may be traced through a resistor 30 and transfer winding 11*d* of stage A.

*Operation of FIG. 2*

Starting with all the cores magnetized in their "zero" directions, assume that a series of positive square wave pulses are applied between the terminals 2 and 3, such that terminal 2 is positive with respect to terminal 3. These positive pulses act in the drive windings to drive all the cores in their "zero" sense. In the stage A, the positive pulse is effective to charge capacitor 12, and when the positive pulse terminates, capacitor 12 discharges through winding 11*a*, producing a current flow therein in a direction to drive the core 11 in the "one" sense. Diode 14 is poled so that the shifting of the core 11 from the "zero" sense to the "one" sense is ineffective to produce a current flow through winding 11*b*. The transfer windings 11*c* and 11*d* are connected in series with resistors 28 and 30 respectively, and also have fewer turns than the output windings, and so are ineffective to produce any substantial current flows in their respective circuits. Thus, at the end of the first positive drive pulse, the core 11 is shifted to its "one" sense, while all the other cores remain in their "zero" sense of magnetization.

On the second positive input pulse, core 11 is driven by winding 1*a* from the "one" sense to the "zero" sense, thereby producing an output pulse in core 11*b*, and charging capacitor 15. The second positive drive pulse in windings 16*a* and 19*a* is again ineffective since the cores 16 and 19 are already magnetized in the "zero" sense. The discharge of capacitor 15 produces a current flow through winding 11*c* in a direction to drive the core 11 to zero. This discharge opposes the discharge of capacitor 12 (charged by the input pulse) and holds core 11 in the "zero" state. The current flowing in winding 11*c* also flows through winding 16*d* in a direction to drive the core 16 in the "one" sense. The same current flows through the carry stage winding 22*c* in a direction to drive the core 22 in a "zero" sense. Thus, at the end of the second input pulse cycle, the cores 11, 19 and 22 remain in their "zero" states of magnetization, while the core 16 is shifted to its "one" state.

On the third positive input pulse, the drive windings 11*a*, 16*a* and 19*a* drive the cores 11, 16 and 19 respectively in the "zero" sense. Since cores 11 and 19 were already in the "zero" state of magnetization, no effect is produced in those cores. The core 16, which was magnetized in the "one" sense is driven in the "zero" sense, thereby producing a current flow in winding 16*b* in the direction to pass through diode 17 and charge capacitor 18. As capacitor 18 discharges, it produces a current flow through winding 16*c* in a direction to drive core 16 in the "zero" sense. The same current passes through winding 19*c* in a direction to drive core 19 in the "one" sense, and passes through winding 22*d* in the direction to drive core 22 in the "one" sense. When capacitor 12 discharges at the end of the third positive input pulse, it is effective to send a current through winding 11*a* to drive core 11 in the "one" sense. Thus at the end of the third input pulse, the cores 11, 19 and 22 are all magnetized in the "one" sense, while the core 16 is magnetized in the "zero" sense.

On the fourth positive input pulse, no effect is produced in core 16, since it is already at the "zero" state. However, the cores 11, 19 and 22 are all driven from the "one" state to the "zero" state, producing a carry output pulse at the terminals 27 and 25. Output pulses are also produced in windings 11*b* and 19*b*, charging the capacitors 15 and 21. When capacitor 15 discharges, it produces a current flow through winding 11*c* in a direction to drive core 11 in the "zero" sense. At the same time, capacitor 12 is discharging and sending a current through winding 11*a* which tends to drive core 11 in the "one" sense. Also at the same time, capacitor 21 is discharging and sending a current through core 11*d* which tends to drive core 11 in the "one" sense. Since there are two drives in the "one" sense and only one in the "zero" sense, core 11 remains magnetized in the "one" sense.

Capacitor 15 in discharging sends a current through winding 16*d* in a direction to drive core 16 in the "one" sense. Since the other windings of core 16 are at this time inactive, core 16 is magnetized in the "one" sense. The same current flows through winding 22*c* in a direction to drive core 22 in the "zero" sense. Since the other windings of core 22 are at this time inactive, core 22 is established in the "zero" sense.

Thus at the end of the fourth input pulse cycle, cores 11 and 16 are magnetized in the "one" sense and cores 19 and 22 are magnetized in the "zero" sense.

On the fifth positive input pulse, cores 11 and 16 which were in the "one" state are driven to the "zero" state by the positive input pulse. Since cores 19 and 22 are already in the "zero" state, the positive input pulse does not affect them. Core 11 in shifting from the "one" state to the "zero" state produces in winding 11*b* a current effective to charge capacitor 15. Core 16 in shifting from the "one" state to the "zero" state is similarly effective to charge capacitor 18. Upon termination of the positive input pulse, capacitor 15 sends a current through winding 11*c* in a direction to drive core 11 towards "zero." The same current flows through winding 16*d* in a direction to drive core 16 toward "one." Capacitor 18 at the same time sends a current through winding 16*c* in a direction to drive core 16 toward the "zero" state. The effects of windings 16*c* and 16*d* oppose each other and hence core 16 remains in the "zero" state. The current flow from capacitor 18 passes through winding 19*c* in a direction to drive core 19 to the "one" state, and also passes through winding 22*d* in a direction to drive core 22 to the "one" state. However, the current from capacitor 15 is at this time passing through winding 22*c* in a direction to drive core 22 to the "zero" state. Consequently, the effects of the windings 22*c* and 22*d* oppose and balance each other. Thus, at the end of the fifth input pulse cycle, core 19 is in the "one" state, and all the others are in the "zero" state.

In the table of FIG. 3, the core states indicated in line numbered 3 in the first column correspond to the core states identified above at the end of the first input pulse cycle. Line 4 corresponds to the states at the end of the second input pulse cycle. Line 0 corresponds to the states at the end of the third input pulse cycle. Line 1 corresponds to the states at the end of the fourth input pulse cycle and line 2 corresponds to the states at the end of the fifth input pulse cycle.

If now a sixth positive input pulse is applied, the core 19 will be shifted from its "one" to its "zero" state by the positive input pulse, thereby producing an output pulse from capacitor 21 which acts in winding 11*d* to drive core 11 toward the "one" state. The discharge of capacitor 12 at the end of the sixth positive input pulse also tends to drive core 11 to the "one" state. Consequently, the cores at the end of the sixth input pulse are all shifted to the states shown in line 3 of the table in FIG. 3.

It has thus been shown that the circuit of FIG. 2, in response to a repeated series of input pulses, produces one output pulse for each five input pulses.

In the cycle illustrated, the first output pulse is produced after three input pulses. In order to reset the counter at "zero," three initial pulses must be supplied to clear this initial carry pulse and set the counter at the condition shown in line 1. The resetting of the counter may be accomplished by means of a separate input line connected to a reset pulse source and separate input windings for cores 11 and 16. Reset pulses from this should be of low amplitude so as to switch the cores slowly without producing significant output pulses.

FIGS. 4 AND 5

These figures illustrate a decimal counter including a binary counter of the type illustrated in FIG. 1 interconnected with a quinary counter such as illustrated in FIG. 2 to produce an output pulse after each succession of ten signal input pulses.

Those elements in FIG. 2 which correspond to their counterparts in FIGS. 1 and 2 have been given the same reference numerals.

The drive windings 1*a* and 11*a* in FIG. 2 are connected in a common input loop with a capacitor 31 and a resistor 32. Capacitor 31 replaces both the capacitor 4 of FIG. 1 and the capacitor 12 of FIG. 2. Resistor 32 replaces both resistor 5 of FIG. 1 and resistor 13 of FIG. 2.

Figures 4, 5:
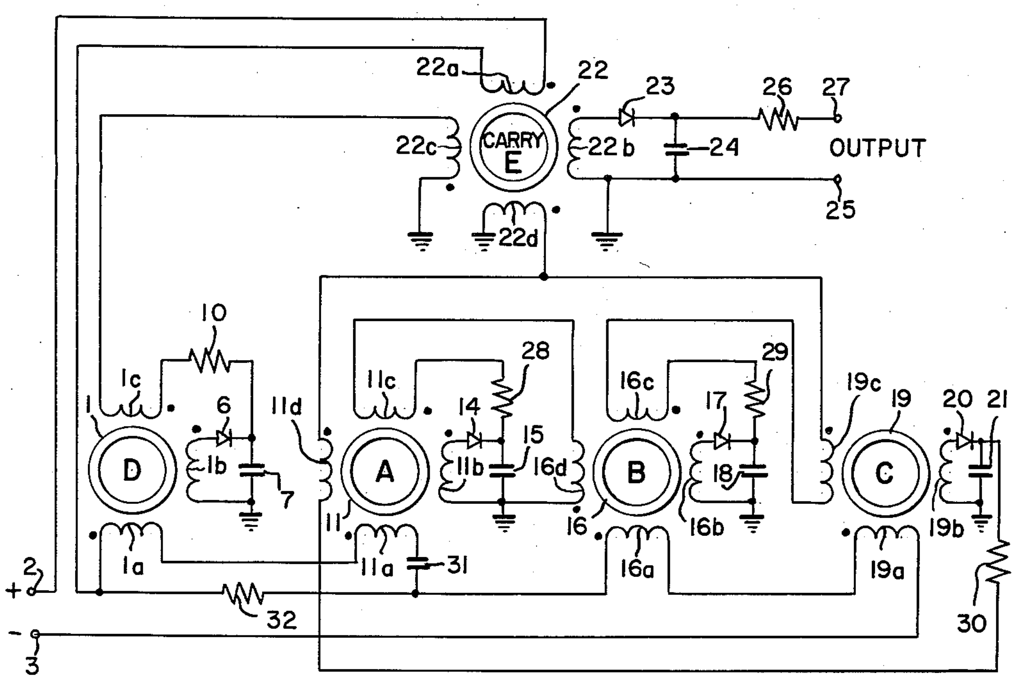
FIG. 4 is a wiring diagram showing one form of decimal counter embodying the invention.
FIGURE 5 is a table illustrating the successive counting steps performed in the counter of FIG. 4.

The binary counter stage is identified in FIGS. 4 and 5 as stage D and the carry stage is identified as stage E. Refrering to FIG. 5, it may be seen that the quinary counter stages A, B, C go through a repeated cycle of five distinctive combinations of binary states, which is the same as the cycle of five combinations illustrated in FIG. 3. Line 1 of FIG. 3 corresponds to lines 2 and 7 of FIG. 5. Lines 0 and 5 of FIG. 5 are the same and correspond to line 4 of FIG. 3. Stage D acts as a typical binary counter. The various inputs to the carry stage are arranged so that a carry output pulse is produced only when the stages B and C are both producing no output pulses (i.e., when they are shifting toward "zero" and the stage D is shifting from "zero" to "one").

Other carry alternatives may be made to work just as well in the counter of FIG. 4 as the one illustrated. For example, the output at the end of the cycle illustrated by the first line in table 5 could be used to trigger the carry stage by providing appropriate connections to the transfer winding 22*d*.

While it would be possible to go through the entire cycle of operation of the counter of FIG. 4, step-by-step, as was done above in the case of the counter of FIG. 2, it is considered that such a detailed description of the operation of the circuit is not necessary to those skilled in the art.

FIGS. 6 AND 7

Figures 6, 7:
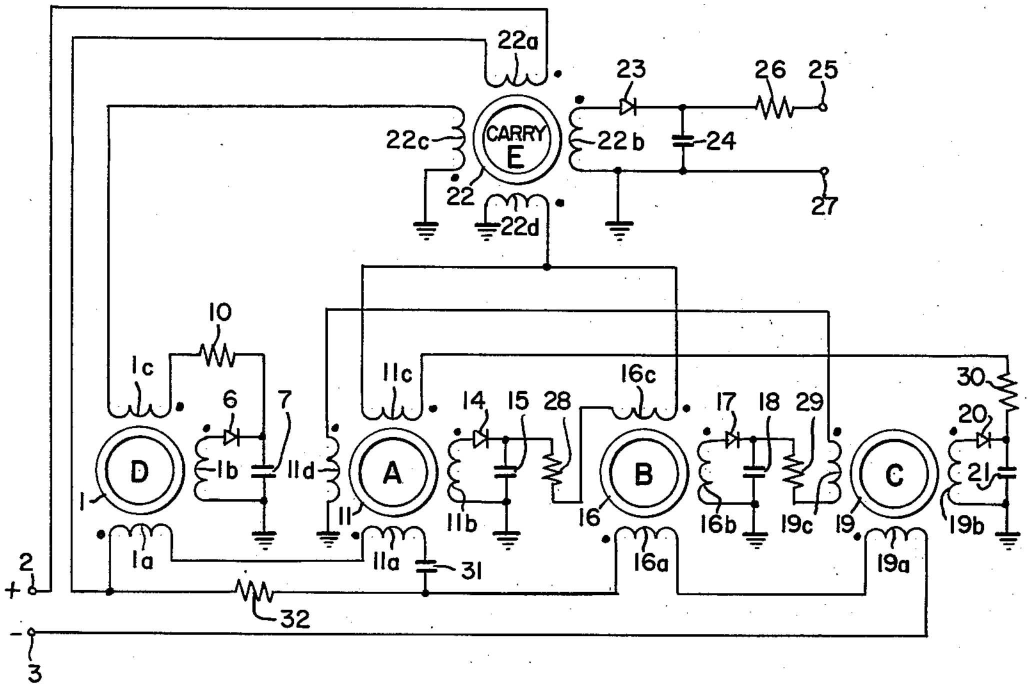
FIG. 6 is a wiring diagram showing a second form of decimal counter embodying the invention.
FIG. 7 is a table showing the counting steps performed by the counter of FIG. 6.

FIG. 6 illustrates a modification of the circuit of FIG. 4. The circuit of FIG. 6 is improved over the circuit of FIG. 4 in that transfer winding 16*d* has been eliminated. It is further improved in that none of the capacitors 15, 18 and 21 is required to supply driving current to more than two transfer windings in series. Note in this respect that the capacitor 18 in FIG. 4 had to send current through windings 16*c*, 19*c* and 22*d* in series.

The discharge circuit for capacitor 15 in FIG. 6 may be traced through resistor 28, transfer winding 16*c* and transfer winding 22*d*. The discharge circuit for capacitor 18 may be traced through resistor 29, transfer winding 19*c* and transfer winding 11*d*. The discharge circuit for capacitor 21 may be traced through the resistor 30, transfer winding 11*c* and transfer winding 22*d*. The circuit of FIG. 6 follows a cycle of combinations of binary stages as illustrated in the table of FIG. 7. A detailed description of the operation of the circuit is believed to be unnecessary.

FIGS. 8 AND 9

These figures illustrate a further modification of a demimal counter embodying the invention. This circuit represents an improvement over the circuit of FIG. 6 in that the transfer winding 11*d* is eliminated. Consequently, only the core 22 has two transfer windings. All the other cores have only one transfer winding. As in the case of FIG. 6, the capacitors 15, 18 and 21 are required to discharge current through only two transfer windings in series.

The discharge circuit for capacitor 15 may be traced through resistor 28, transfer winding 16*c*, and transfer winding 19*c*. The discharge circuit for capacitor 18 may be traced through resistor 29, transfer winding 22*d* and transfer winding 19*c*. The discharge circuit for capacitor 21 may be traced through resistor 30, transfer winding 11*c* and transfer winding 22*c*.

FIGS. 10 AND 11

Figures 10, 11:
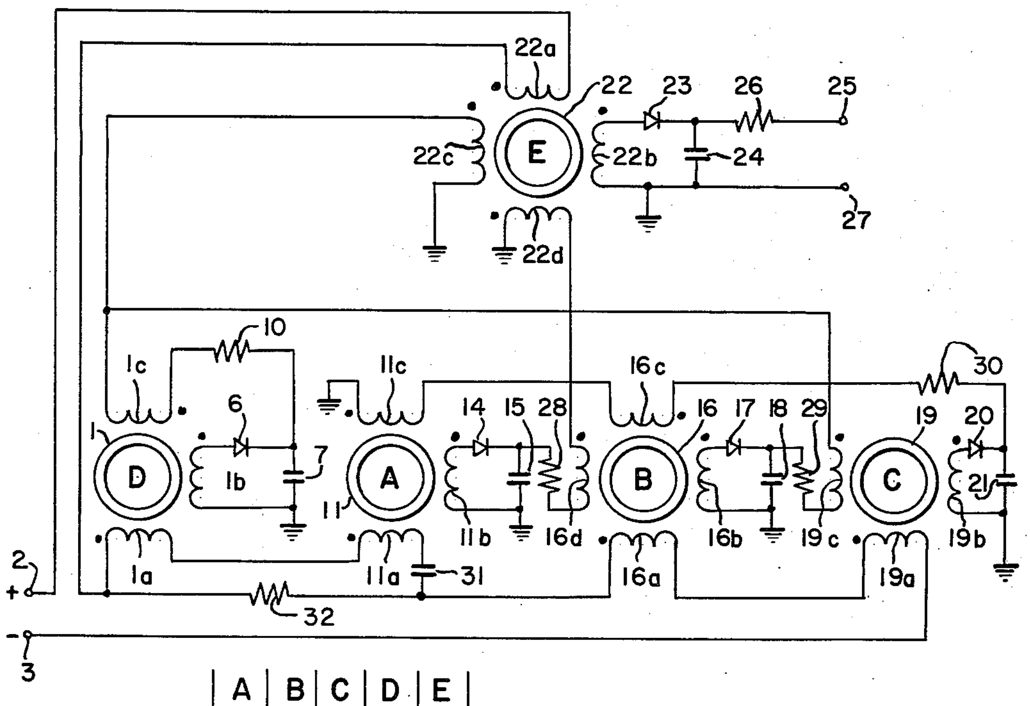
FIG. 10 is a wiring diagram of a fourth form of decimal counter embodying the invention.
FIG. 11 is a table showing the various counting steps performed by the counter of FIG. 10.

FIG. 10 illustrates another modification of a decimal counter embodying the invention. As in the case of the circuits of FIGS. 6 and 8, no capacitor is required to discharge through more than two transfer windings. One of the cores, namely core 16, has to have two transfer windings in this circuit, which in that respect is not as desirable as the circuit of FIG. 8.

In FIG. 10, the discharge circuit of capacitor 15 may be traced through resistor 28, transfer winding 16*d* and transfer winding 22*d*. The discharge circuit of capacitor 18 may be traced through resistor 29, transfer winding 19*c* and transfer winding 22*c*. The discharge circuit of capacitor 21 may be traced through resistor 30, transfer winding 16*c* and transfer winding 11*c*.

Figures 8, 9:
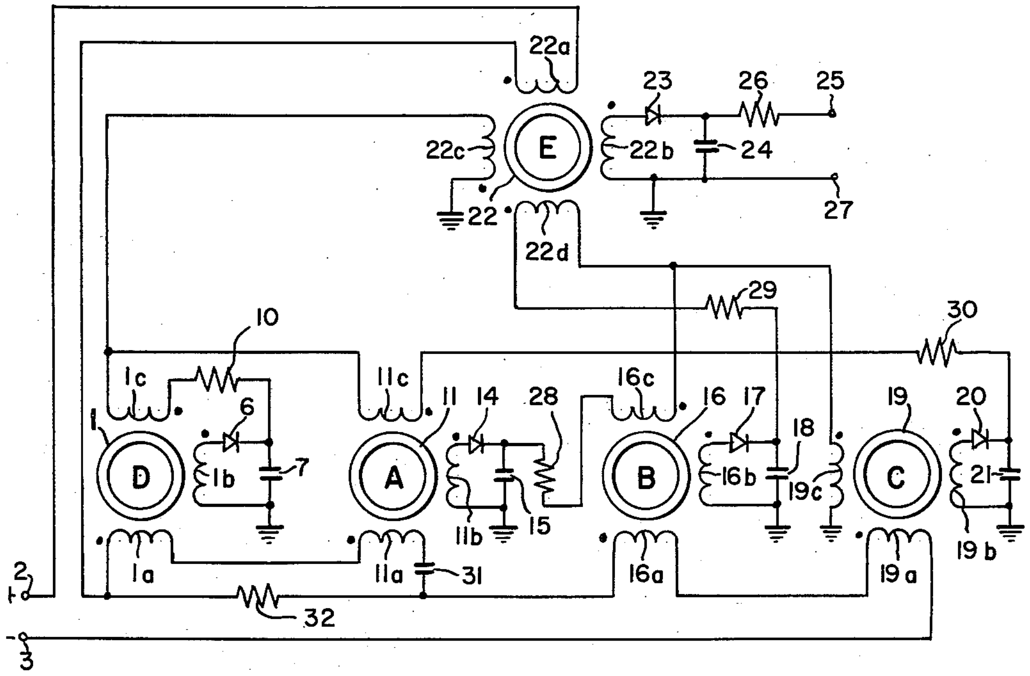
FIG. 8 is a wiring diagram of a third form of decimal counter embodying the invention.
FIG. 9 is a table showing the counting steps performed by the counter of FIG. 8.

The operation of the circuits of FIGS. 8 and 10 is illustrated in the tables of FIGS. 9 and 11 respectively. A detailed description of the individual steps in the operation is considered to be unnecessary.

While we have shown and described certain preferred embodiments of our invention, other modifications thereof will readily occur to those skilled in the art, and we therefore intend our invention to be limited only by the appended claims.

We claim:

1. A decimal counter comprising:
(*a*) a binary counting stage;
(*b*) a quinary counter comprising first, second and third counting stages and a carry stage;
(*c*) each stage comprising a magnetic core having a substantially rectangular hysteresis loop, a drive winding, an output winding, and at least one transfer winding, and being shiftable between two binary states respectively characterized by magnetization of the core in opposite directions;
(*d*) said carry stage having at least two transfer windings;
(*e*) means for supplying to the drive windings of all the stages a succession of separated input pulses, each said pulse acting through each drive winding to tend to magnetize the associated core in one direction; and
(*f*) means connecting the output winding of each stage to the transfer winding of at least one other stage;
(*g*) said connecting means for the three quinary counting stages including output-transfer winding connections predetermined so that those three stages pass through a repeated cycle of five individually distinctive combinations of binary states;
(*h*) said connecting means for the transfer windings of the carry stage including:
    (1) a connection between the output winding of the binary counting stage and one of said carry stage transfer windings; and
    (2) connections between two of the output windings of two of the three quinary counting stages and at least one of the carry stage transfer windings;
(*i*) said output-transfer winding connections (1) and (2) predetermined so that an output pulse in the carry stage output winding when and only when the three quinary counting stages pass from a particular one of said five combinations of binary states to the succeeding combination simultaneously with the passage of the binary counting stage from one particular binary state to the other.

2. A decimal counter comprising:
(*a*) a binary counting stage;
(*b*) a quinary counter comprising first, second and third counting stages and a carry stage;

(*c*) each stage comprising:
    (1) a magnetic core having a substantially rectangular hysteresis loop;
    (2) a drive winding;
    (3) an output winding;
    (4) at least one transfer winding; and
    (5) a diode and a capacitor connected in a series loop with the output winding to charge the capacitor by output pulses of one polarity only;
(*d*) each stage being shiftable between two binary states respectively characterized by magnetization of the core in opposite directions;
(*e*) means for supplying to the drive windings of all the stages a succession of separated input pulses, each said pulse acting through each drive winding to tend to magnetize the associated core in one direction;
(*f*) means for supplying to the drive windings of the binary counting stage and the first quinary counting stage a reverse pulse following each input pulse and tending to magnetize the associated core in the opposite direction, and
(*g*) means connecting the output winding of each stage to the transfer windings of at least one other stage;
(*h*) said connecting means for the three quinary counting stages including output-transfer winding connections predetermined so that those three stages pass through a repeated cycle of five individually distinctive combinations of binary states;
(*i*) said connecting means for the transfer windings of the carry stage including output-transfer winding connections predetermined so that an output pulse is produced in the carry stage output winding when and only when the three quinary counting stages pass from a particular one of said five combinations of binary states to the succeeding combination simultaneously with the passage of the binary counting stage from one particular binary state to the other;
(*j*) said output-transfer winding connections (*h*) and (*i*) including a discharge path for each of said capacitors, the discharge path for the capacitor of the binary counting stage including in series the transfer winding of that stage, and the discharge path of the capacitor of one of the quinary counting stages including in series the transfer winding of the first quinary counting stage.

3. A quinary counter comprising:
(*a*) first, second and third counting stages and a carry stage;
(*b*) each stage comprising:
    (1) a magnetic core having a drive winding;
    (2) an output winding;
    (3) at least one transfer winding; and
    (4) a diode and a capacitor connected in a series loop with the output winding to charge the capacitor by output pulses of one polarity only;
(*c*) means for supplying to the drive windings of all the stages a succession of separated input pulses, each said pulse acting through each drive winding to tend to magnetize the associated core in one direction;
(*d*) means for supplying to the drive winding of the first quinary counting stage a reverse pulse following each input pulse and tending to magnetize the associated core in the opposite direction, and
(*e*) means connecting the output winding of each stage to the transfer winding of at least one other stage;
(*f*) said connecting means for the three counting stages including output-transfer winding connections predetermined so that those stages pass through a repeated cycle of five individually distinctive combinations of binary states;
(*g*) said connecting means for the transfer windings of the carry stage including output-transfer winding connections predetermined so that an output pulse is produced in the carry stage output winding when and only when the three counting stages pass from a particular one of said five combinations of binary states to the succeeding one;

(*h*) said output-transfer winding connections (*f*) and (*g*) including a discharge path for each of said capacitors;

(*i*) the discharge path for the capacitor of the first quinary counting stage including in series:

(1) a first transfer winding of the first quinary counting stage acting in the same sense as the drive winding thereof;

(2) a first transfer winding of the second quinary counting stage acting in the same sense as the drive winding thereof; and (3) a first transfer winding of the carry stage acting in the same sense as the drive winding thereof;

(*j*) the discharge path of the capacitor of the second quinary counting stage including in series:

(1) a second transfer winding of said second quinary counting stage acting in the same sense as the drive winding thereof;

(2) a transfer winding of the third quinary counting stage acting in the same sense as the drive winding thereof; and (3) a second transfer winding of the carry stage acting in the same sense as the drive winding thereof; and (*k*) the discharge path for the capacitor of the third quinary counting stage including a second transfer winding of the first quinary counting stage acting in the opposite sense to the drive winding thereof.

4. A decimal counter as defined in claim 1, in which said connections (2) comprise connections from the output windings of each of the second and third quinary counting stages to one of the carry stage transfer windings other than the one conected to the binary stage output winding.

5. A decimal counter as defined in claim 1, in which said connections (2) comprise connections from the output windings of each of the first and third quinary counting stages to one of the carry stage transfer windings other than the one connected to the binary stage output winding.

6. A decimal counter as defined in claim 1, in which said connections (2) include a connection from the output winding of the second quinary counting stage to one of the carry stage transfer windings, and a connection from the output winding of the third quinary counting stage to another of the carry stage transfer windings.

7. A decimal counter as defined in claim 1, in which said connections (2) include a connection from the output winding of the first quinary counting stage to one of the carry stage transfer windings, and a connection from the output winding of the second quinary counting stage to another one of the carry stage transfer windings.

8. A decimal counter as defined in claim 2, in which the drive pulse supply means (*e*) comprises means connecting the drive windings of the second and third counting stages in series with a resistor, means connecting the drive windings of the binary counting stage and the first quinary counting stage in a series branch with a capacitor, and means connecting said series branch across the terminals of the resistor.

9. A decimal counter as defined in claim 2, in which: the discharge path of the capacitor of the binary counting stage includes in series the transfer winding of said binary counting stage acting in the same sense as the drive winding thereof and a first transfer winding of the carry stage acting in the opposite sense to the drive winding thereof; the discharge path of the capacitor of the first quinary counting stage includes the transfer winding of said first quinary counting stage acting in the same sense as the drive winding thereof and the transfer winding of said second quinary counting stage acting in the opposite sense to the drive winding thereof; the discharge path of the capacitor of the second quinary counting stage includes a transfer winding of said second quinary counting stage acting in the same sense as the drive winding thereof, the transfer winding of the third quinary counting stage acting in the same sense as the drive winding thereof and a second transfer winding of the carry stage acting in the opposite sense to the drive winding thereof; and the discharge path of the capacitor of the third quinary counting stage includes a second transfer winding of the first quinary counting stage acting in the same sense as the drive winding thereof and said second transfer winding of the carry stage acting in the opposite sense to the drive winding thereof.

10. A decimal counter as defined in claim 2 in which: the discharge path of the capacitor of the binary counting stage includes in series the transfer winding of said counting stage acting in the same sense as the drive winding thereof and a first transfer winding of the carry stage acting in the opposite sense to the drive winding thereof; the discharge path of the capacitor of the first quinary counting stage includes the transfer winding of the second quinary counting stage acting in the same sense as the drive winding thereof and a second transfer winding of the carry stage acting in the opposite sense to the drive winding thereof; the discharge path of the capacitor of the second quinary counting stage includes the transfer winding of the third quinary counting stage acting in the same sense as the drive winding thereof and a first transfer winding of the first quinary counting stage acting in the same sense as the drive winding thereof; and the discharge path of the capacitor of the third quinary counting stage includes a second transfer winding of the first quinary counting stage acting in the same direction as the drive winding thereof and said second transfer winding of the carry stage acting in the opposite sense to the drive winding thereof.

11. A decimal counter as defined in claim 2, in which: the discharge path of the capacitor of the binary counter stage includes in series the transfer winding of said binary counting stage acting in the same sense as the drive winding thereof and a first transfer winding of the carry stage acting in the opposite sense to the drive winding thereof; the discharge path of the capacitor of the first quinary counting stage includes the transfer winding of the second quinary counting stage acting in the same sense as the drive winding thereof and the transfer winding of the third quinary counting stage acting in the opposite sense to the drive winding thereof; the discharge path of the capacitor of the second quinary counting stage includes a second transfer winding of the carry stage acting in the opposite sense to the drive winding thereof and said transfer winding of the third quinary counting stage acting in the opposite sense to the drive winding thereof; and the discharge path of the capacitor of the third quinary counting stage includes the transfer winding of the first quinary counting stage acting in the same sense as the drive winding thereof and said first transfer winding of the carry stage acting in the same sense as the drive winding thereof.

12. A decimal counter as defined in claim 2, in which: the discharge path of the capacitor of the binary counting stage includes in series the transfer winding of said binary counting stage acting in the same sense as the drive winding thereof and a first transfer winding of the carry stage acting in the opposite sense to the drive winding thereof; the discharge path of the capacitor of the first quinary counting stage includes a first transfer winding of the second quinary counting stage acting in the same sense as the drive winding thereof and a second transfer winding of the carry stage acting in the opposite sense to the drive winding thereof; the discharge path of the capacitor of the second quinary counting stage includes the transfer winding of the third quinary counting stage acting in the same sense as the drive winding thereof and said first transfer winding of the carry stage acting in the opposite sense to the drive winding thereof; and the discharge path of the capacitor of the third quinary counting stage includes a second transfer winding of the second quinary counting stage acting in the same direction as the drive winding thereof and the transfer winding of the first quinary counting stage acting in the opposite direction to the drive winding thereof.

References Cited in the file of this patent

UNITED STATES PATENTS

| | | |
|---|---|---|
| 2,566,918 | Bergfors | Sept. 4, 1951 |
| 2,795,776 | Epstein | June 11, 1952 |
| 2,781,504 | Canepa | Feb. 12, 1957 |
| 2,828,071 | Burton | Mar. 25, 1958 |
| 2,832,541 | Guttridge | Apr. 29, 1958 |
| 2,843,320 | Chisholm | July 15, 1958 |
| 2,960,684 | Auerbach | Nov. 15, 1960 |